(12) United States Patent
Masaki et al.

(10) Patent No.: US 10,981,241 B2
(45) Date of Patent: Apr. 20, 2021

(54) SOLDER HANDLING APPARATUS

(71) Applicant: Hakko Corporation, Osaka (JP)

(72) Inventors: Hiroyuki Masaki, Osaka (JP); Teruhiko Yamamoto, Osaka (JP)

(73) Assignee: HAKKO CORPORATION, Osaka (JP)

( * ) Notice: Subject to any disclaimer, the term of this patent is extended or adjusted under 35 U.S.C. 154(b) by 254 days.

(21) Appl. No.: 15/988,285

(22) Filed: May 24, 2018

(65) Prior Publication Data

US 2018/0345398 A1 Dec. 6, 2018

Related U.S. Application Data

(60) Provisional application No. 62/513,583, filed on Jun. 1, 2017.

(51) Int. Cl.
*B23K 3/03* (2006.01)
*B23K 3/06* (2006.01)
*B23K 3/047* (2006.01)
*B23K 3/08* (2006.01)
*B23K 3/02* (2006.01)

(52) U.S. Cl.
CPC ............ *B23K 3/033* (2013.01); *B23K 3/0478* (2013.01); *B23K 3/063* (2013.01); *B23K 3/0615* (2013.01); *B23K 3/08* (2013.01); *B23K 3/025* (2013.01)

(58) Field of Classification Search
None
See application file for complete search history.

(56) References Cited

U.S. PATENT DOCUMENTS

| | | | | |
|---|---|---|---|---|
| 2,821,947 A * | 2/1958 | Von Knauf | .......... | B23K 3/0615 226/128 |
| 2,952,763 A * | 9/1960 | Amuth | .................. | B23K 3/0615 228/53 |
| 3,990,622 A * | 11/1976 | Schurman, Jr. | ...... | B23K 3/0615 228/53 |
| 4,216,894 A * | 8/1980 | Gleizes | ................ | B23K 3/0615 221/266 |
| 4,434,925 A * | 3/1984 | Jacobs | ................... | B65H 67/00 226/127 |
| 4,793,541 A * | 12/1988 | Dravnieks | .............. | B23K 3/063 219/229 |
| 5,279,573 A * | 1/1994 | Klosterman | .... | A61M 25/09041 206/403 |
| 5,379,941 A * | 1/1995 | Partel | ................... | B23K 3/0615 226/167 |
| 6,369,359 B1 * | 4/2002 | Morrison | ............. | B23K 3/0615 219/229 |

(Continued)

FOREIGN PATENT DOCUMENTS

WO WO-2015068147 A1 * 5/2015 ........... B23K 3/0615

*Primary Examiner* — Joseph M. Pelham
(74) *Attorney, Agent, or Firm* — Squire Patton Boggs (US) LLP

(57) ABSTRACT

A solder feed structure has a solder exit aperture with an elongated shape. The elongated shape can help reduce the incidence of clogging, as it has a dimension that is significantly larger than the wire diameter of solder. The solder feed structure has a bent segment leading up to the solder exit aperture. The arc of the bent segment can cause the solder wire to be in a stable position at one end of the elongated shape of the solder exit aperture instead of wobbling within the solder exit aperture.

16 Claims, 4 Drawing Sheets

(56) References Cited

U.S. PATENT DOCUMENTS

| | | | | |
|---|---|---|---|---|
| 7,829,010 B2 * | 11/2010 | Schwadron | ............. | B22D 1/00 |
| | | | | 222/606 |
| 8,302,837 B1 * | 11/2012 | De Berardinis | ..... | B23K 1/0008 |
| | | | | 228/41 |
| 8,343,045 B2 * | 1/2013 | Swinehart | ............. | B21D 21/00 |
| | | | | 600/184 |
| D680,830 S * | 4/2013 | De Berardinis | ................ | D8/14 |
| 2007/0075119 A1 * | 4/2007 | Wong | .................... | B23K 3/063 |
| | | | | 228/101 |
| 2011/0168762 A1 * | 7/2011 | Chang | ................... | B23K 3/025 |
| | | | | 228/41 |
| 2014/0166730 A1 * | 6/2014 | Taylor | ..................... | B23K 3/02 |
| | | | | 228/110.1 |
| 2014/0291384 A1 * | 10/2014 | Canelo | .................. | B23K 3/063 |
| | | | | 228/101 |

\* cited by examiner

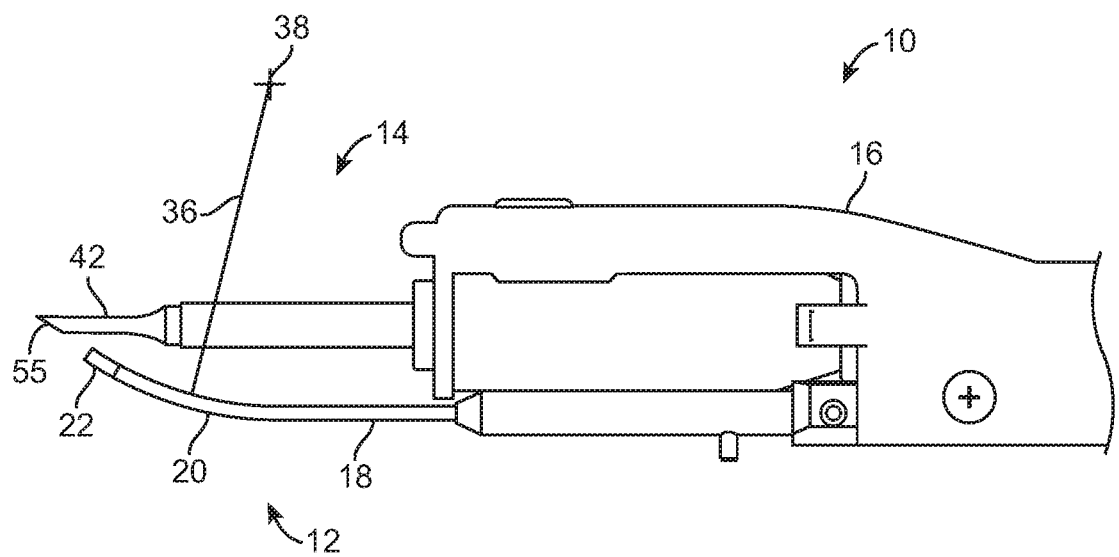
FIG. 1A
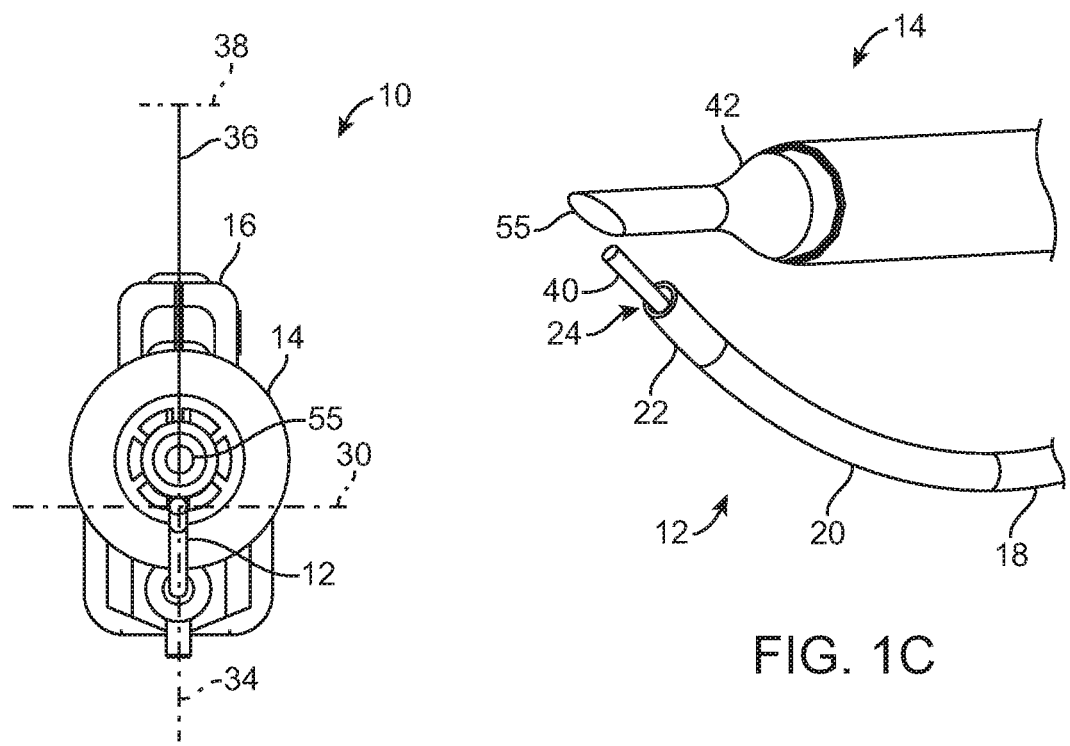
FIG. 1B
FIG. 1C

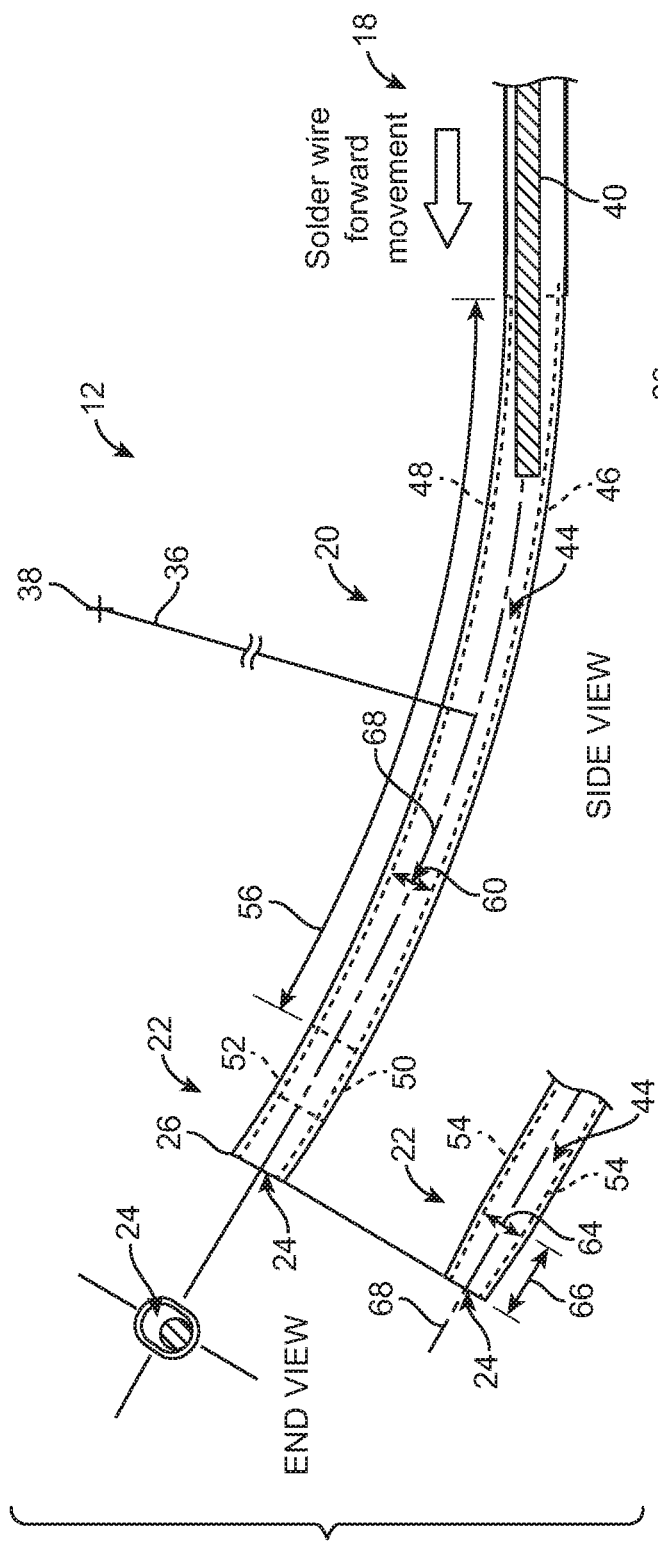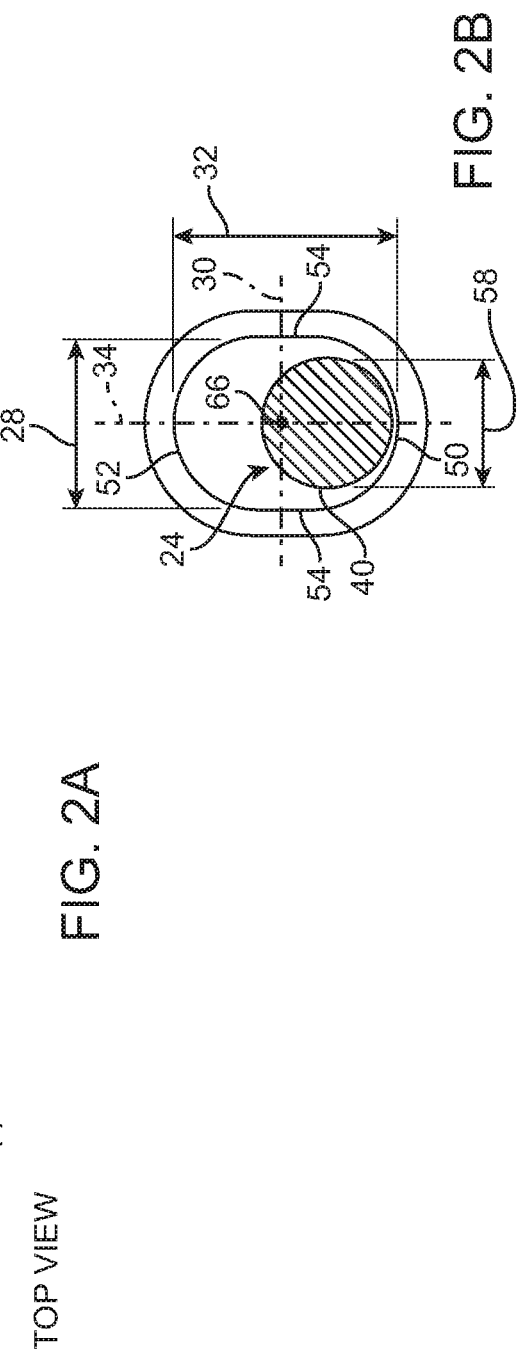

SOLDER HANDLING APPARATUS

CROSS-REFERENCE TO RELATED APPLICATION

This application claims the benefit of U.S. Provisional Application No. 62/513,583, filed Jun. 1, 2017, the entire disclosure of which is incorporated herein by reference.

FIELD

This disclosure relates generally to solder handling and, more particularly, an apparatus for soldering.

BACKGROUND

Soldering irons and similar devices are used to apply solder to a work piece, such as an electronic component on a printed circuit board. A solder feed structure can be used to deliver solder in the form of a wire to the tip of the soldering iron. The feed structure must direct the solder wire with accuracy to a desired location, allow an unobstructed view of the work piece, and avoid becoming clogged with flux material. Flux is a chemical agent that facilitates soldering by removing oxidation from a work piece. Conventional feed structures have difficulty with the above requirements, particularly when fine diameter solder wire is used for small electronic components. Accordingly, there is a continuing need for a solder feed structure that satisfies these requirements.

SUMMARY

Briefly and in general terms, the present invention is directed to a solder handling apparatus.

In aspects of the invention, an apparatus comprises a solder feed structure. The solder feed structure comprises a solder inlet segment; a solder outlet segment, there being a solder exit aperture at an end of the solder outlet segment, the solder exit aperture having an aperture width along a minor axis and an aperture height along a major axis, the aperture height being greater than the aperture width; and a bent segment located between and connecting the solder inlet segment and the solder outlet segment.

The features and advantages of the invention will be more readily understood from the following detailed description which should be read in conjunction with the accompanying drawings.

BRIEF DESCRIPTION OF THE DRAWINGS

FIG. 1A is a side view of an example solder handling apparatus having a solder feed structure and a solder melting device.

FIG. 1B is a front view of the solder handling apparatus.

FIG. 1C is a perspective view showing the solder feed structure and the solder melting device.

FIG. 2A is third-angle orthographic projection showing side, end, and top views of the solder feed structure.

FIG. 2B is an enlarged end view of the solder feed structure.

DETAILED DESCRIPTION

Figure 3A:
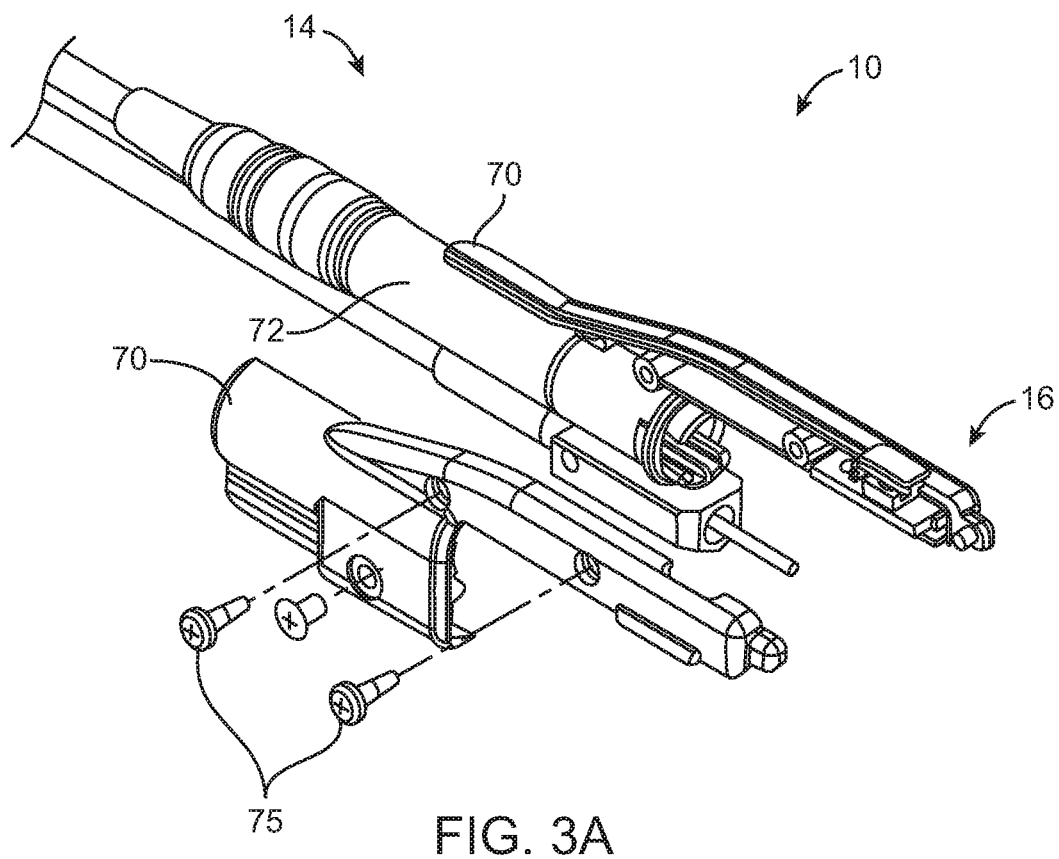
FIG. 3A-3D are views illustrating an example assembly procedure for the solder handling apparatus.

Referring now in more detail to the drawings for purposes of illustrating non-limiting examples, wherein like reference numerals designate corresponding or like elements among the several views, there is shown in FIGS. 1A, 1B and 1C example solder handling apparatus 10 that comprises solder feed structure 12 and solder melting device 14. Solder feed structure 12 is secured to solder melting device 14 by mount 16 such that, during a soldering operation, solder feed structure 12 does not shift position relative to solder melting device 14. As discussed below, solder feed structure 12 is configured to deliver solder accurately to a desired location relative to solder melting device 14.

Solder feed structure 12 comprises solder inlet segment 18, bent segment 20, and solder outlet segment 22. Bent segment 20 is located between and connects solder inlet segment 18 and solder outlet segment 22. Solder inlet segment 18, bent segment 20, and solder outlet segment 22 are made of heat resistant material, such as stainless steel or other metal, so that they can withstand the heat generated by solder melting device 14.

As shown in FIG. 2A, solder exit aperture 24 is located at end 26 of the solder outlet segment 22. As seen from the end view of FIG. 2B, solder exit aperture 24 has aperture width 28 along minor axis 30 and aperture height 32 along major axis 34. Minor axis 30 and major axis 34 are centered on solder exit aperture 24. Minor axis 30 is perpendicular to major axis 34. Aperture height 32 is greater than the aperture width 28, which gives exit aperture 24 an elongated shape. Bent segment 20 has bend radius 36 about bend axis 38. Bend radius 36 is greater than aperture height 32. For example, bend radius 36 can be more than ten times greater than aperture height 32. Bend radius 36 provides a relatively gentle curvature so that a solder wire can travel smoothly through bent segment 20.

As shown in FIG. 2B, solder exit aperture 24 is significantly larger than the cross section of solder wire 40. This can reduce the incidence of flux material clogging solder exit aperture 24. Normally, such a large size for an exit aperture can result in positional instability of the solder wire, allowing the solder wire to wobble towards soldering tip 42 (FIG. 1C). However, as discussed below, bend radius 36 of bent segment 20 and other features help to ensure positional stability of solder wire 40.

Solder passageway 44 runs though solder inlet segment 18, bent segment 20, and solder outlet segment 22. Within bent segment 20, solder passageway 44 is defined in part by outer arc surface 46 (FIG. 2A) and inner arc surface 48. Within solder outlet segment 22, solder passageway 44 is defined in part by lower surface 50 (FIG. 2A), upper surface 52, and side surfaces 54. As solder wire 40 moves forward through solder inlet segment 18, solder wire 40 is forced into contact with outer arc surface 46 due to bend radius 36. The continuous curvature of bent segment 20 causes solder wire 40 to become positioned close to or pressed against lower surface 50 within solder outlet segment 22. Thus, solder wire 40 is in a stable position at one end of the elongated shape of solder exit aperture 24 instead of wobbling within solder exit aperture 24. To encourage this result, bend radius 36 can be coplanar with major axis 34, and bend axis 38 can be parallel to minor axis 30, as shown in FIG. 1B. By being coplanar, major axis 34 and the sweep of bend radius 36 are present on an imaginary plane. That imaginary plane (designated by lines 34 and 36 in FIG. 1B) may intersect forward tip 55 of soldering tip 42. As shown in FIG. 1C, solder exit aperture 24 faces toward soldering tip 42. As solder wire 40 protrudes out of solder exit aperture 24, solder wire 40 is guided in the direction of soldering tip 42 by lower surface 50 (FIG. 2B) and side surfaces 54 of solder outlet segment 22.

In the example of FIG. 2A, the continuous curvature of bent segment 20 is defined by arc angle 56 that is roughly 30 degrees. Arc angle 56 should be large enough so that solder wire 40 will be in a stable position at one end of the elongated shape of solder exit aperture 24 instead of wobbling within solder exit aperture 24. For example, arc angle 56 can be at least 20 degrees or at least 30 degrees. To minimize the amount of space taken by bent segment 20, arc angle 56 can be limited to be less than 60 degrees. For example, arc angle 56 can be from 20 degrees to 60 degrees, or from 30 degrees to 60 degrees.

FIG. 2A shows solder inlet segment 18 and solder outlet segment 22 as being straight, i.e., with no bend radius. By being straight, solder outlet segment 22 can guide solder wire 40 to travel in a straight line toward soldering tip 42. Alternatively, solder outlet segment 22 may be curved. For example, solder outlet segment 22 may have a bend radius that is the same as or different from bend radius 36 of bent segment 20.

Solder inlet segment 18, bent segment 20, and solder outlet segment 22 are interconnected to form a metal pipe, such as a stainless steel pipe. Seams are interfaces where one part abuts another part. The number of seams is preferably minimized to facilitate smooth travel of solder wire 40 within solder feed structure 12. For example, the metal pipe can be a unitary pipe structure without a seam between any two or more of solder inlet segment 18, bent segment 20, and solder outlet segment 22.

Solder passageway 44 extends through the pipe. The pipe can have inner diameter 60 (FIG. 2A) in bent segment 20 and solder inlet segment 18 that is about 0.4 mm greater than wire diameter 58 (FIG. 2B). In other words, passageway 44 can have a clearance of about 0.4 mm relative to solder wire 40. As used herein, the term "about" when applied to a dimension means that the dimension can in the range of plus and minus 25%. Thus, a clearance of about 0.4 mm means that inner diameter 60 can be from 0.3 mm to 0.5 mm greater than wire diameter 58. This clearance is present in bent segment 20 and solder inlet segment 18. This clearance helps solder wire 40 travel smoothly within solder feed structure 12. A polytetrafluoroethylene (e.g., Teflon) inner tube may be disposed within solder feed structure 12 to facilitate smooth travel; however, with this clearance, it is possible for solder bent segment 20 and solder inlet segment 18 to not have a polytetrafluoroethylene or other polymer inner tube.

To enhance positional stability of solder wire 40, the above-described clearance is reduced at solder outlet segment 22 along the direction of minor axis 30, such that aperture width 28 has a clearance of about 0.3 mm relative to solder wire 40. As mentioned above, "about" refers to plus and minus 25%. Thus, in this example, aperture width 28 is from 0.23 mm to 0.38 mm greater than wire diameter 58. In another example, aperture width 28 is at least 0.2 mm greater than wire diameter. That is, aperture width 28 has a clearance of at least 0.2 mm relative to solder wire 40.

To avoid clogging by flux material, the clearance is enlarged at solder outlet segment 22 along the direction of major axis 34. Aperture height 32 may have a clearance of about 0.66 mm relative to solder wire 40. As mentioned above, "about" refers to plus and minus 25%. Thus, in this example, aperture height 32 is from 0.50 mm to 0.83 mm greater than wire diameter 58. In another example, aperture height 32 is at least 0.4 mm greater than wire diameter 58. That is, aperture height 32 has a clearance of at least 0.4 mm relative to solder wire 40.

At solder outlet segment 22, the clearance along the direction of major axis 34 may be from 1.7 to 2.3 times the clearance along the direction of minor axis 30. For example, aperture width 28 may be 0.3 mm greater than wire diameter 58 while aperture height 32 is 0.66 mm greater than wire diameter 58. In this example, the clearance (0.66 mm) of aperture height 32 is 2.2 times greater than the clearance (0.3 mm) of aperture width 28.

The clearance reduction along minor axis 30 can be achieved by applying a clamping force in the direction of minor axis 30 on solder outlet segment 22. The clamping force will slightly flatten the sides of solder outlet segment 22 to form side surfaces 54 (FIG. 2B).

As shown in the top view of solder outlet segment 22 in FIG. 2A, solder exit aperture 24 is at the end of solder passageway 44. Solder passageway 44 has interior width 64 located at distance 66 away from solder exit aperture 24. Interior width 64 can have the same value as inner diameter 60 (FIG. 2A). Distance 66 can be less than 10 mm. Aperture width 28 (FIG. 2B) is less than interior width 64 (FIG. 2A), which is due to the above-described clearance reduction along minor axis 30. Note that the measurement direction of interior width 64 is parallel to minor axis 30.

Within solder outlet segment 22, solder passageway 44 has central axis 68 (FIG. 2A). Bend radius 36 can be measured from bend axis 38 to central axis 68. Minor axis 30 (FIG. 2B) can be perpendicular to central axis 68. Major axis 34 can be perpendicular to central axis 68. The end view of FIG. 2B is a view in the direction of central axis 68.

The above-described solder feed structure 12, with its curvature and flattened end, provides an elegant solution for achieving both positional stability and a reduced risk of clogging by flux material. Solder feed structure 12 is an improvement over a design in which positional stability is attempted with an exit aperture that is a circle with a circumference having minimal clearance relative to the solder wire. Such a design can be prone to clogging. In addition, such a design may be more costly by requiring a swaging operation to achieve the circumference with minimal clearance or by requiring fabrication of a nozzle attachment to be mounted at the end of the solder feed structure.

FIGS. 3A-3D illustrate an example assembly procedure. First, as shown in FIG. 3A, mount 16 is secured to solder melting device 14. Mount 16 comprises grip attachment 70 which is configured to attached solder feed structure 12 (FIG. 3C) to grip 72 of solder melting device 14. Grip attachment 70 comprises two parts. One part is placed on one side of grip 72, and then the other part is place on the other side of grip 72. The two parts meet with grip 72 sandwiched in between. Screws 75 hold the two parts 70 together.

Figure 3B:
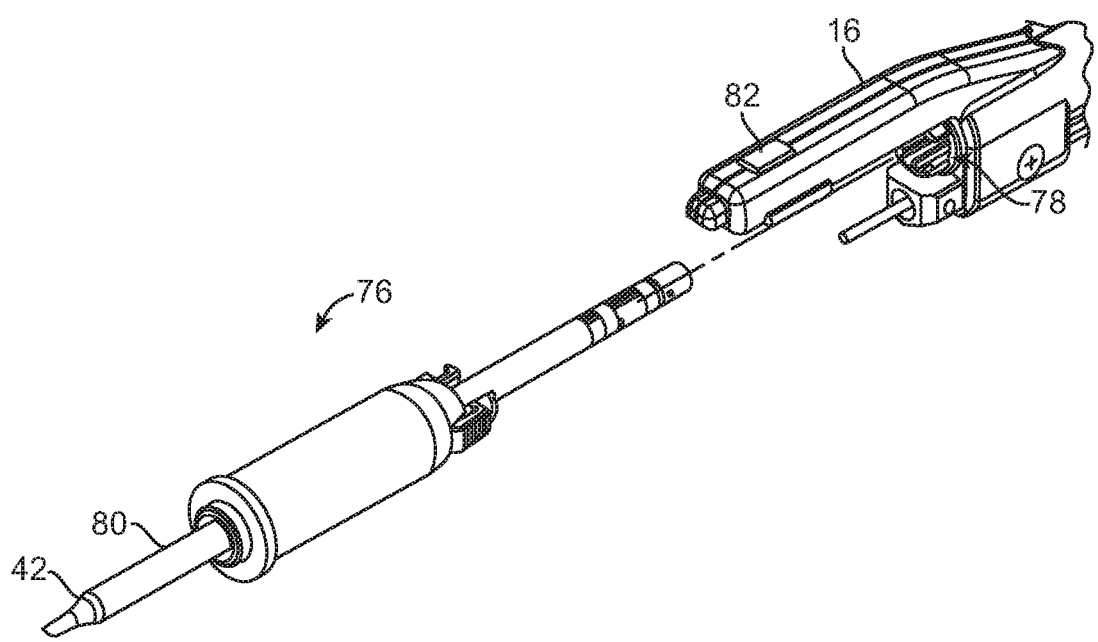

Next, as shown FIG. 3B, cartridge 76 is inserted into socket 78 of grip 72. Cartridge 76 comprises soldering tip 42 and heater 80. Heater 80 is configured to deliver heat to soldering tip 42. For example, heater 80 may comprise an electric heating element that receives power via socket 78. Mount 16 comprises switch 82 for controlling solder movement through solder feed structure 12, which will be attached later.

Figure 3C:
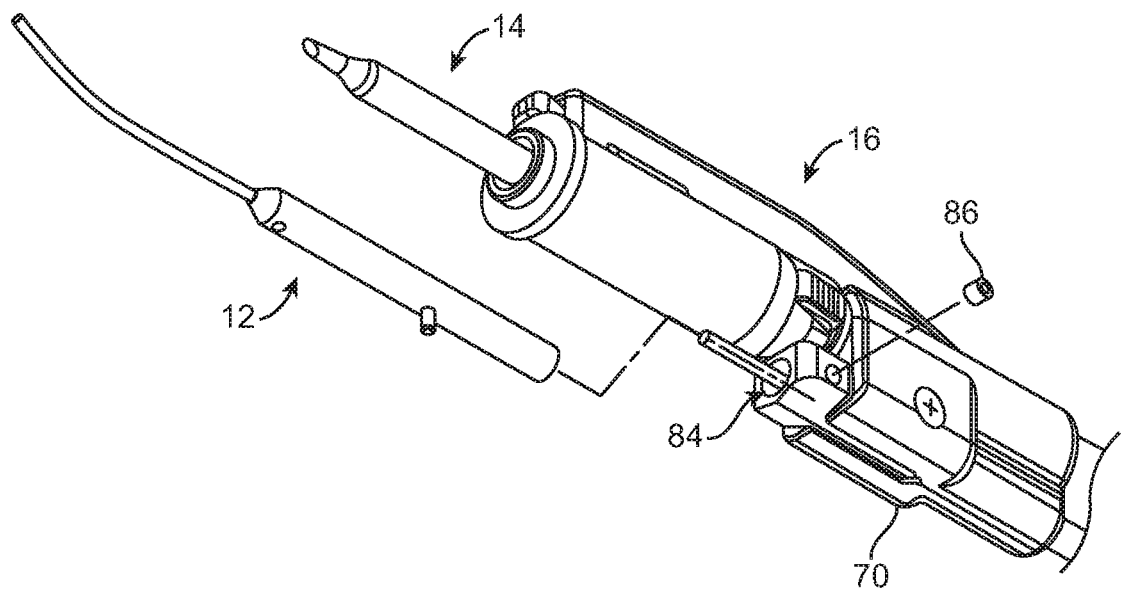

As shown in FIG. 3C, mount 16 comprises socket assembly 84 configured to receive solder feed structure 12. Solder feed structure 12 is inserted into socket assembly 84, and then set screw 86 is used to camp solder feed structure 12 in place. Set screw 86 has a tightened state that prevents solder feed structure 12 from sliding out of socket assembly 84. Set screw 86 has a loose state that allows solder feed structure 12 to slide in and out of socket assembly 84. Socket assembly 84 may comprise a motor which is controlled by switch 82 (FIG. 3B) and is configured to push solder wire 40 into solder feed structure 12.

Figure 3D:
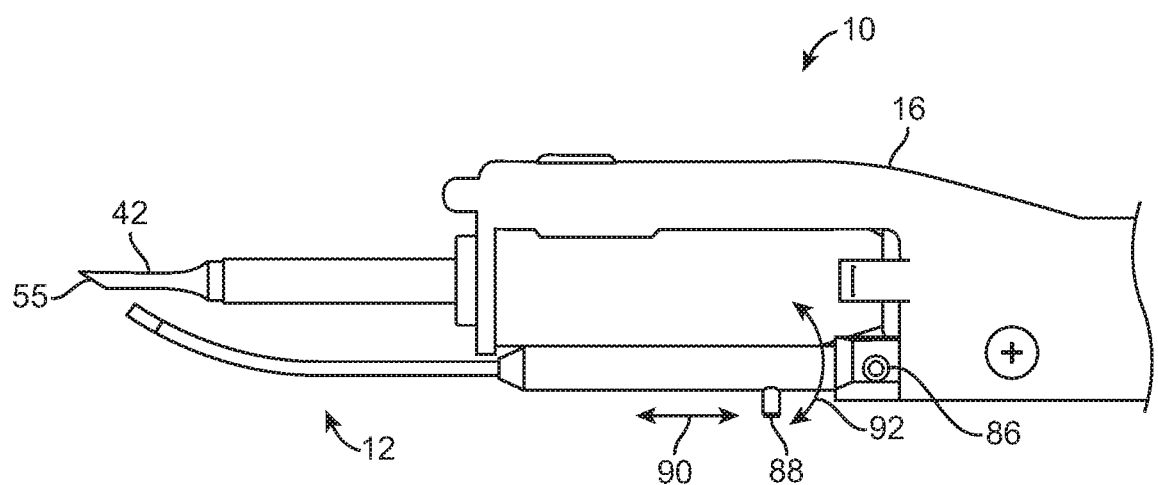

As shown in FIG. 3D, solder feed structure 12 comprises exposed adjustment knob 88 for sliding solder feed structure 12 on mount 16 while set screw 86 is at its loose state. A user can use knob 88 to adjust the position of solder feed structure 12 so that the solder wire is delivered to its intended location at or in front of forward tip 55 of soldering tip 42. For example, the user can use knob 88 to slide solder feed structure 12 linearly as indicated by arrow 90. Additionally or alternatively, the user can use knob 88 to slide solder feed structure 12 rotationally as indicated by arrow 92. When satisfied with the position of solder feed structure 12, the user can tighten set screw 86.

From the foregoing description, it will be appreciated that an existing solder melting device can be readily retrofitted to include solder feed structure 12 by attaching mount 16 onto the grip of the solder melting device. Screws 75 are used for mounting. Thus, when solder feed structure 12 is no longer needed, mount 16 can be easily removed together with solder feed structure 12 by simply unscrewing screws 75.

Mount 16 is unobtrusive on grip 72, which allows the user to manipulate apparatus 10 with accuracy. In addition, the form factor of solder feed structure 12 is relatively small so as not to obstruct the user's view of a work piece. The ability to manipulate apparatus 10 with accuracy with a clear view of the work piece is particularly important for small work pieces. In such cases, wire diameter 58 can be 0.6 mm or smaller. In general, however, wire diameter 58 can be less than 1 mm, less than 2 mm, or less than 3 mm.

As mentioned above, alternative designs may have a nozzle attachment (for positional stability) at the end of a solder feed structure and/or a polymer inner tube (for smooth solder movement) within the solder feed structure. One or both of these elements can be omitted from solder feed structure 12. As explained above, solder feed structure 12 may achieve positional stability, smooth solder movement, and reduced clogging without a nozzle attachment and a polymer inner tube. The absence of one or both of these elements contributes to the relatively small form factor of solder feed structure 12.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. A solder handling apparatus comprising:
   two sockets; and
   a solder feed structure comprising:
      a solder inlet segment;
      a solder outlet segment, there being a solder exit aperture at an end of the solder outlet segment, the solder exit aperture having an aperture width along a minor axis and an aperture height along a major axis, the aperture height being greater than the aperture width; and
      a bent segment located between and connecting the solder inlet segment and the solder outlet segment,
   wherein a mount comprises a grip attachment and a switch for controlling solder movement through the solder feed structure, and the grip attachment is configured to attach the solder feed structure to a grip of a solder melting device,
   wherein the grip attachment comprises two parts.

2. The apparatus of claim 1, wherein the bent segment has a bend radius about a bend axis, and the bend radius is greater than the aperture height.

3. The apparatus of claim 2, wherein the bend radius is coplanar with the major axis.

4. The apparatus of claim 2, wherein the bend axis is parallel to the minor axis.

5. The apparatus of claim 1, wherein the solder exit aperture forms an end of a solder passageway that extends through the solder outlet segment, the solder passageway has an interior width located at a distance away from the solder exit aperture, and the interior width is greater than the aperture width.

6. The apparatus of claim 1, wherein the solder inlet segment, the bent segment, and the solder outlet segment are interconnected to form a pipe.

7. The apparatus of claim 6, wherein the pipe is a unitary pipe structure without a seam between any of the solder inlet segment, the bent segment, and the solder outlet segment.

8. The apparatus of claim 1, further comprising the solder melting device, the solder melting device comprising a soldering tip, wherein the solder exit aperture faces toward the soldering tip.

9. The apparatus of claim 8, wherein the solder melting device further comprises a heater configured to deliver heat to the soldering tip.

10. The apparatus of claim 8, further comprising a mount on the solder melting device, the mount configured to attach the solder feed structure to the solder melting device.

11. The apparatus of claim 10, wherein the solder feed structure is configured to slide on the mount.

12. The apparatus of claim 10, wherein the mount comprises a socket assembly comprising at least one of the two sockets and configured to receive the solder feed structure, and comprises a set screw having a tightened state that prevents the solder feed structure from sliding out of the socket assembly and a loose state that allows the solder feed structure to slide in and out of the socket assembly.

13. The apparatus of claim 12, wherein the solder feed structure further comprises an exposed adjustment knob for sliding the solder feed structure on the mount while the set screw is at the loose state.

14. The apparatus of claim 1, further comprising a solder wire, wherein the aperture width has a clearance of at least 0.2 mm relative to the solder wire, and the aperture height has a clearance of at least 0.4 mm relative to the solder wire.

15. The apparatus of claim 1, further comprising a solder wire, wherein clearance of the aperture height relative to the solder wire is from 1.7 to 2.3 times clearance of the aperture width relative to the solder wire.

16. A solder handling apparatus comprising:
    a solder feed structure comprising:
       a solder inlet segment;
       a solder outlet segment, there being a solder exit aperture at an end of the solder outlet segment, the solder exit aperture having an aperture width along a minor axis and an aperture height along a major axis, the aperture height being greater than the aperture width; and
       a bent segment located between and connecting the solder inlet segment and the solder outlet segment, wherein the bent segment is not flattened.

* * * * *